(12) United States Patent
Crivelli (10) Patent No.: US 6,179,479 B1
(45) Date of Patent: Jan. 30, 2001

(54) FIBER OPTIC CONNECTOR WITH SELF-CLOSING SHUTTER

(75) Inventor: Franco Crivelli, Milan (IT)

(73) Assignee: VEAM S.r.L., Milan (IT)

( * ) Notice: Under 35 U.S.C. 154(b), the term of this patent shall be extended for 0 days.

(21) Appl. No.: 09/350,486

(22) Filed: Jul. 9, 1999

(51) Int. Cl.$^7$ .................................................. G02B 6/36
(52) U.S. Cl. .................................. 385/73; 385/83; 385/84
(58) Field of Search .................................. 385/73, 83, 84, 385/64, 65, 66, 67

(56) References Cited

U.S. PATENT DOCUMENTS

| | | | |
|---|---|---|---|
| 4,611,887 | * 9/1986 | Glover et al. | 359/224 |
| 5,329,604 | * 7/1994 | Baldwin et al. | 385/92 |
| 5,570,445 | * 10/1996 | Chou et al. | 385/92 |
| 5,825,955 | * 10/1998 | Ernst et al. | 385/79 |
| 6,076,975 | * 6/2000 | Roth | 385/76 |

* cited by examiner

Primary Examiner—Mohammad Y. Sikder
(74) Attorney, Agent, or Firm—Lowe, Hauptman, Gilman & Berner (57) ABSTRACT

An optical connector is disclosed which includes self-closing shutters to protect the optical contacts from environmental contamination when male and female portions of the connector are disconnected. The optical connector is comprised of male and female portions having means for permitting interconnection while the male and female portions are slightly axially misaligned. Male and female portions of the optical connector each contain one or more spring loaded optical contacts protected by a shutter mechanism and having a body with a spring loaded shutter cap and a shutter disk. The shutter disk contains two apertures which can be made to align with two apertures in the cap of the shutter when the shutter is rotated to an open position. The optical contacts contained in each portion of the optical connector are exposed for interconnection when the male and female portions of the optical connector are joined together. Means are also provided to ensure that the optical connection between contacts contained in the male and female portion of the connector is established even if there is slight misalignment between the male and female portions of the optical connector.

7 Claims, 5 Drawing Sheets

FIBER OPTIC CONNECTOR WITH SELF-CLOSING SHUTTER

FIELD OF THE INVENTION

The present invention relates generally to fiber optic connectors, and more particularly to fiber optic connectors in which the connection between fibers can be made without manual intervention.

BACKGROUND OF THE INVENTION

Fiber optic circuits are finding increasing uses today in a variety of applications for carrying signals which have heretofore been transmitted in electrical form. For example, railway cars, particularly for passenger applications, use a variety of control circuits which must be mated to the control circuits in adjacent cars. The electrical circuits control a variety of applications such as heating and cooling of the cars, the status of safety features such as temperature sensors and sensors to detect the performance of safety related items such as brakes, and for communications such as for intercoms and signaling devices to permit a conductor to provide information to passengers and to the operator of the train. Heretofore, connections of electrical signals for the foregoing applications between adjacent cars were made by connecting multicontact electrical connectors to carry signals of the foregoing type between adjacent cars. When it was desired to remove or add a car from a train to lengthen or shorten the train (depending upon the passenger load factor) it was necessary for a railroad employee to manually connect or disconnect the electrical connectors between adjacent cars to effect a connection or disconnection of the control signals to permit the additional railway car to be added or removed from the train.

More recently, electrical connectors have been incorporated into automatic railway car couplers. The automatic couplers permit coupling or uncoupling of railway cars from a railroad train without manual intervention, and the automatic couplers can be equipped with electrical connectors which automatically make contact with the control circuits in adjacent cars without requiring manual connection or disconnection of the electrical connectors between adjacent cars. For example, a coupler for use on light rail vehicles is manufactured by Dellner-Schaku, Inc. of Mount Prospect, Ill. Couplers of the appropriate type are sold under their model numbers Type 31 and Type 32. The couplers have side-mounted retractable electrical heads which will connect up to seventy-five electrical signals. Another coupler sold by Dellner-Schaku is sold under its Type 26 designation and is a fully automatic coupler designed for rapid transit vehicles and other rail vehicles as well. The coupler is said to be self-aligning, both horizontally and vertically and contains electrical contacts in the form of two side-mounted retractable electrical heads. Uncoupling of the coupler can be accomplished either automatically from the driver's console or manually on the coupler.

While such automatic railway car couplers having self-connecting electrical couplers are advantageous for eliminating the requirement to have a railroad employee effect a manual connection or disconnection of the electrical connections, the contacts in such automatic couplers are subject to environmental contamination and damage. Thus, the quality of the contact between control circuits in adjacent cars becomes difficult to control, and requires frequent inspection of the electrical contacts in the connectors to ensure that a reliable electrical connection is made between control circuits of adjacent cars. This detriment become particularly important in railway applications where the number of railway cars used to make up a train changes frequently depending on passenger load conditions. For example, it is desirable to have railway trains of sufficient length (that is composed of a sufficient number of railway cars) in the morning and afternoon to accommodate rush hour traffic, but to remove excessive numbers of cars during midday and evening operations so that the size of the train matches the expected passenger load. Obviously, the act of making up or breaking down railway trains to accommodate the anticipated passenger load requires the connection or disconnection of electrical connectors between adjacent cars each time that a car is added to or removed from a train. Needless to say, mechanical action associated with frequently connecting or disconnecting adjacent electrical connectors can adversely affect the electrical performance of the contact in the connector and can lead to contamination of the contacts when the connectors are disconnected and are subject to ambient environmental conditions.

Use of fiber optic bundles to transmit signals between adjacent railway cars would be advantageous in that many signals could be multiplexed on a fiber optic carrier and the resulting optical signal could be transmitted between adjacent cars. Fiber optic connectors are known in the art which would permit the connection and disconnection of optical fibers, however, such connectors expose the ends of the optical fiber to environmental contamination when the connectors are disconnected. The ends of the optical fibers may be protected by manually sealing the ends with an end cap or other means, however, this expedient requires manually placing a cap on the end of the fiber optic connector each time that it is disconnected from its adjacent connector. Obviously, this arrangement would be difficult to implement for railway cars which may be frequently connected or disconnected from adjacent cars to make up a railway train. Furthermore, cleaning the end of a fiber optic bundle to ensure the complete removal of environmental contamination requires skilled personnel who would typically not be available to perform this service on a routine basis. Thus, while the use of fiber optics to transmit control signals between adjacent railway cars is advantageous, a means for automatically connecting and disconnecting adjacent fiber optic bundles on adjoining cars would be desirable. Furthermore, it would also be desirable if such means for connecting and disconnecting adjacent fiber optic bundles included means for protecting the ends of the fiber optic bundles from environmental contamination.

Accordingly, a need exists for a means of connecting control signals between adjacent cars in a railway train which avoids environmental contamination affecting the quality of the signal transmitted between adjacent railway cars. A further need exists for a connector in which coupling and uncoupling can be accomplished automatically without manual intervention.

SUMMARY OF THE INVENTION

It is an object of the present invention to provide a fiber optic connector which is automatically coupled to an adjacent fiber optic connector when railway cars are coupled together.

It is another object of the present invention to provide a fiber optic connector which includes means for protecting the ends of the fiber optic bundle from environmental contamination when the male and female halves of the connector are uncoupled.

It is another object of the present invention to provide a fiber optic connector in which the process of connecting the male and female portions of the connector result in automatic exposure of the male and female fiber optic contacts without manual intervention.

Still another object of the present invention is to provide a fiber optic connector which may be used with automatic railroad car couplers to avoid any manual intervention in connecting control circuits between adjacent railroad cars.

These and other objects of the present invention are accomplished by providing a fiber optic connector having male and female portions. The male portion includes one or more male fiber optic contacts and the female portion includes a corresponding number of female fiber optic contacts which may receive the male fiber optic contact when the male and female portions of the connector are mated together.

The male fiber optic contacts and the female fiber optic contacts are located, respectively, within a shutter cap which protects the contacts from environmental contamination and physical damage when the male and female portions of the optical connector are unmated. Coil springs contained in the male portion of the fiber optic connector and the female portion of the fiber optic connector bias the shutter caps away from the optical contacts when the connector portions are unmated. When the male portion and the female portion of the fiber optic connector are mated, the shutter caps are biased against the force of the coil springs of the male and female portions, and retract into spaces provided in the body of the male and female portions of the fiber optic connector. Each shutter cap includes a shutter mounted on a shaft. The shutter may be rotated relative to the end of the shutter cap so that apertures contained in the shutter cap and shutter may be aligned to expose the optical contacts to permit mating of the male and female portions of the fiber optic connector. Rotation of the shutter is effected by controlling rotation of the shaft on which the shutter is mounted by use of a fixed camtrack and a follower mounted on the shaft.

The male and female optical contacts may be spring biased to provide a tight connection between the male and female contacts when the male and female portions of the fiber optic connector are mated. The male and female contacts may be loosely mounted within the male and female portions of the connector to facilitate alignment of the male and female optical contacts with each other during mating.

The male and female portions of the fiber optic connector are mounted in mounting flanges. Preferably, the male and female portions are mounted into their respective flanges using coil springs to facilitate connection of the male and female portions of the fiber optic connector even though slight axial misalignment may be present between the male and female portions of the connector.

Still other objects and advantages of the present invention will become readily apparent to those skilled in the art from the following detailed description, wherein the preferred embodiments of the invention are shown and described, simply by way of the illustration of the best mode contemplated for carrying out the invention. As will be appreciated, the invention is capable of other and different embodiments, and its details are capable of modifications in many respects, all of which would be obvious to one skilled in the art, all without departing from the invention. Accordingly, the drawings and description thereof are to be regarded as illustrative in nature only, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figures 1A, 1B:
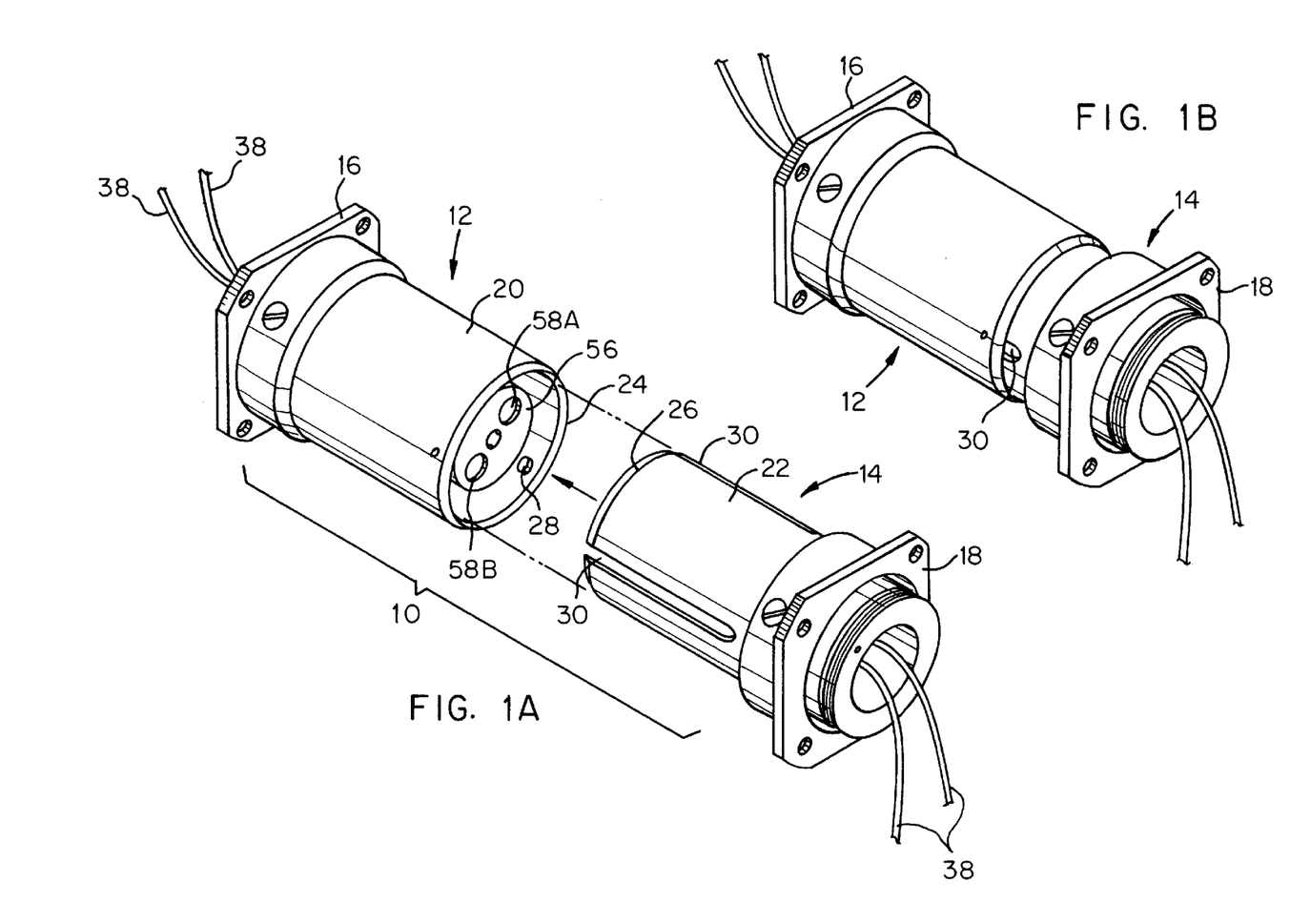
FIG. 1A is a perspective view of the male and female portions of a fiber optic connector constructed according to the teachings of the present invention, shown in an uncoupled position.
FIG. 1B is a perspective view of the male and female portions of the fiber optic connector in a coupled position.

Referring first to FIG. 1A, a fiber optic connector generally indicated at 10 is depicted in accordance with the principals of the present invention. Although the fiber optic connector is depicted as in a horizontal orientation, it should be understood that the present invention is operable in any orientation and accordingly terms such as "left" and "right" as used herein are to be construed in the relative sense. The fiber optic connector 10 includes a female portion 12 and a male portion 14. Female portion 12 is connected to a mounting flange 16 in a manner which will be described in greater detail later on. Similarly, male portion 14 is connected to a mounting flange 18. Female portion 12 includes a female body 20 and male portion 14 includes a male body 22. Female body 20 includes an inwardly tapered section 24 at its forward end and male body 22 includes a complementary tapered portion 26 at its forward end. Tapered portion 26 is intended to facilitate engagement of male body 22 into female body 20 even if slight axial misalignment exists between female portion 12 and male portion 14. Female body 12 includes three roller studs 28 equally spaced about the circumference of the interior and located just inside the front opening of female body 20. Male body 22 includes three alignment grooves 30 on the exterior portion of male body 22. Alignment grooves 30 are spaced around the circumference of male body 22 to engage roller studs 28 in the interior portion of female body 20 when male body 22 is inserted within female body 20 during coupling of the fiber optic connector.

Figure 2A:
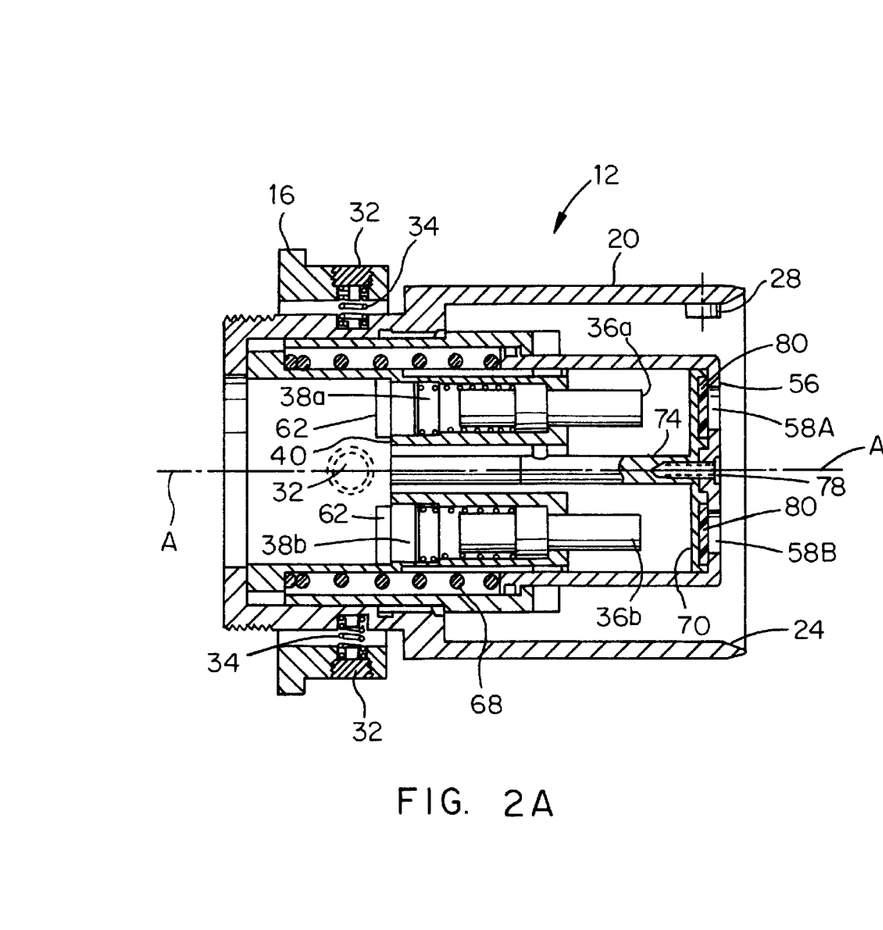
FIG. 2A is a side cross-sectional elevational view of the female portion of the connector.
Figure 2B:
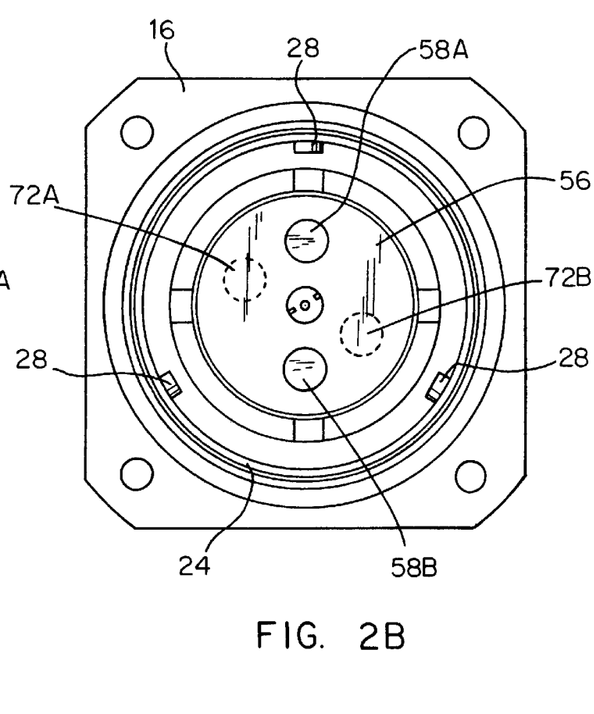
FIG. 2B is a front elevational view of the female portion of the connector shown in FIG. 2A.
Figure 3A:
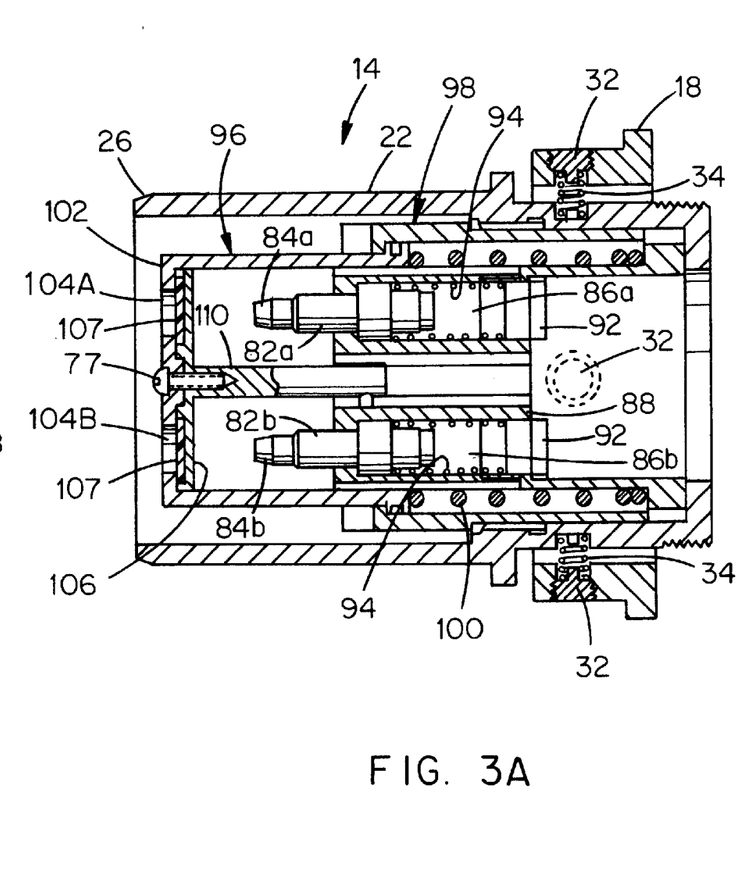
FIG. 3A is a side cross-sectional elevational view of the male portion of the connector.
Figure 3B:
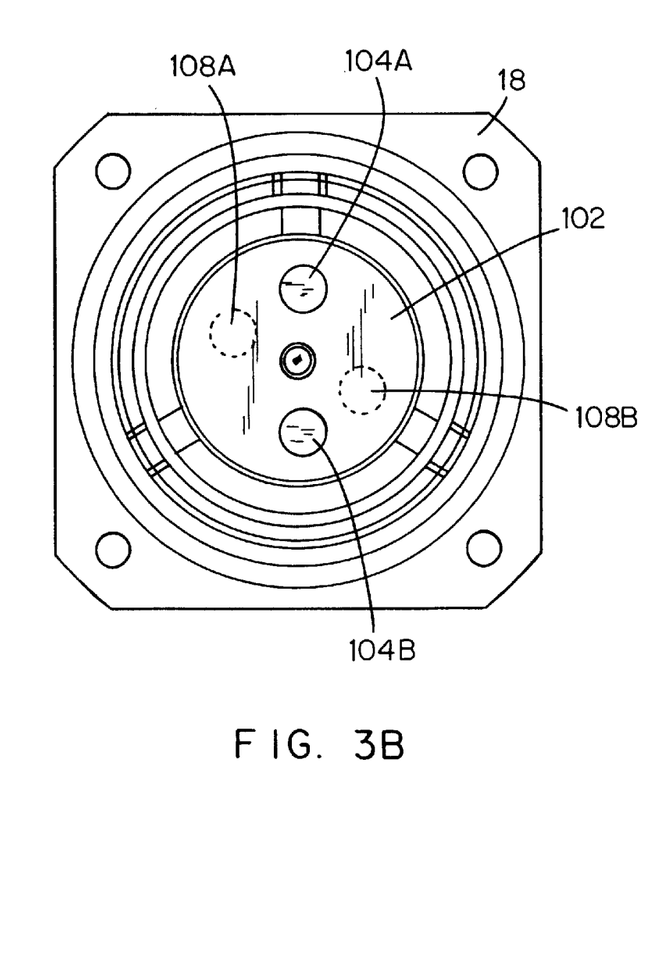
FIG. 3B is a front elevational view of the male portion of the connector shown in FIG. 3A.

FIGS. 2A and 3A show, respectively, the female portion 12 and male portion 14 of the fiber optic connector 10. Female body 20 is shown floatingly secured to mounting flange 16 by four screws 32 and springs 34 spaced at an equal distance around the circumference of female body 20. Preferably, springs 34 are retained between mounting flange 16 and female body portion 20 by the screws 32. Female body 20 is thus allowed to float with respect to its mounting flange 16 to permit limited motion of body portion 20 with respect to the central axis A of female portion 12. Similarly, male body 22 is fastened to mounting flange 18 using four screws 32 and springs 34 in a like manner to achieve a like effect.

Female portion 12 of the fiber optic connector is shown containing two optical contacts 36a and 36b. Preferably these contacts are connected to optical fibers 38 (see FIG. 1A) and are constructed in accordance with known means. Preferably, each optical contact 36a, 36b includes a lens (not shown) located in its interior for focusing optical signals from optical contacts 36a, 36b into mating male contacts (to be later described) contained in male body 22. Optical contacts 36a, 36b are contained in apertures 38a, 38b respectively which, in turn, are located within an insert 40 of a shutter mechanism shown generally at 42 (see FIG. 4A). The shutter mechanism 42 of female portion 12 includes a shutter body 44 having an outer wall 46 and an inner wall 48 with a space 50 between outer wall 46 and inner wall 48. A shutter cap shown generally at 52 has a cylindrical wall 54 which can occupy space 50 when in its retracted position. Shutter cap 52 also includes fixed cap portion 56 at the top position of shutter cap 52 and which includes apertures 58A and 58B which are respectively positioned to coincide (i.e., to be aligned with) the longitudinal axes of optical contacts 36a and 36b respectively.

Optical contacts 36a and 36b rest on coil springs 60 which are retained within the apertures 38a, 36b by plugs 62. The apertures 38a and 38b may be of sufficient diameter to permit the optical contacts to be loosely received in the apertures to permit the optical contacts to be regularly displaced slightly relative to the longitudinal axis of the apertures 38a and 38b. Plugs 62 may be screwed into, glued or otherwise fastened to insert 40 after the optical contacts are loaded into the apertures 38a and 38b. For purposes of repair and inspection, it is preferred that plugs 62 are screwed into threaded apertures in insert 40 so that they may be easily removed without damaging any components of the fiber optic connector. Springs 60 permit the optical contacts 36a and 36b to be biased outwardly from insert 40 of shutter body 44. For sake of clarity, optical contacts 36a and 36b are not shown connected to optical fibers 38, however, such connections may be made in any number of ways known to those skilled in the art.

Insert 40 contains a hollow shutter guide pin 64 which includes a camtrack 66. Space 50 between outer wall 46 and inner wall 48 of shutter mechanism 42 contains a coil spring 68. Coil spring 68 biases shutter cap 52 outwardly from shutter body 44 when the male and female portions of the fiber optic connector are in an unmated position.

Figures 4A, 4B, 4C:
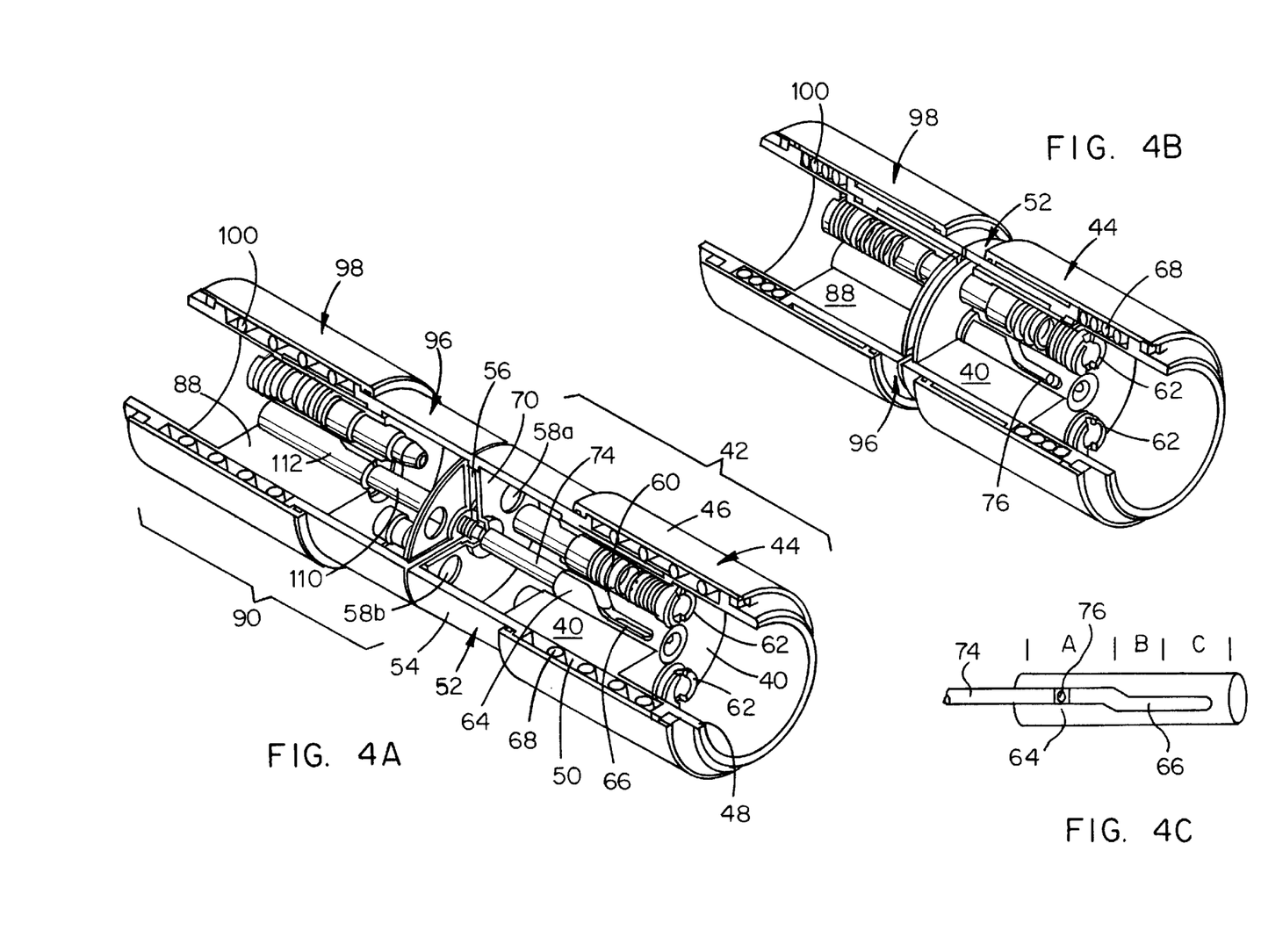
FIG. 4A is a side cross-sectional perspective view showing the shutters of the male and female portions of the connector before mating.
FIG. 4B is a side perspective cross-sectional elevational view of the shutters of the male and female portions of the connector shown in a mated position.
FIG. 4C is a side view of a cam and cam-follower which may be used to control opening of the shutters.

Shutter disk 70 is located just beneath cap portion 56 of shutter cap 52 and contains apertures 72A and 72B. Shutter disk 70 is rigidly fastened to shaft 74. Shaft 74 is received within shutter guide pin 64. Shaft 74 includes a stud 76 which is fastened at one end thereof. Stud 76 rides in camtrack 66 contained within shutter guide pin 64. FIGS. 4A and 4C show that the design of the camtrack 66 is shaped to effect rotation of shutter 70 when shaft 74 is moved into shutter guide pin 64.

Figure 6A:
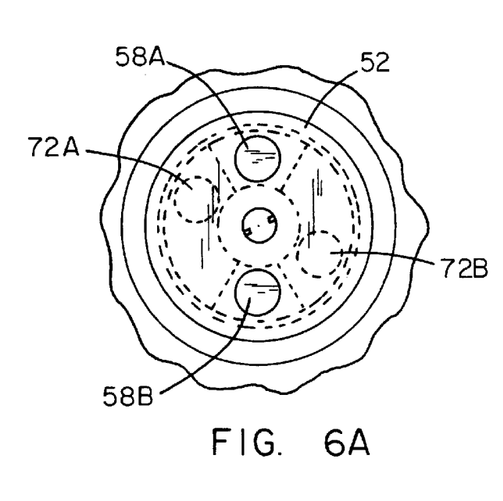
FIG. 6A is a front view of the shutter mechanism when the shutter is closed over the optical contacts in the female half of the connector.
Figure 6B:
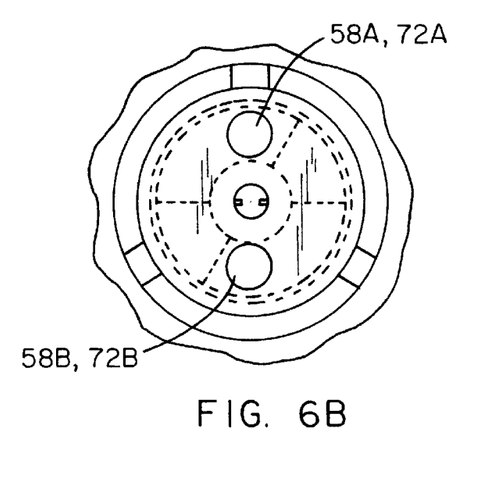
FIG. 6B is a front view showing the shutter in an open position to expose the optical contacts in the female half of the connector.

FIG. 4C shows that camtrack 66 on shutter guide pin 64 includes three distinct sections: An upper guide section A; a transition section B; and a lower guide section C. As shaft 74 moves within shutter guide pin 64, the shutter cap 52 and the shutter 70 move downwardly and the shutter cap 52 moves into the aperture between walls 46 and 48 of shutter body 44. At the time that stud 76 moves through the transition section B of the camtrack 66, shutter disk 70 rotates 60° due to the shape of camtrack 66 in transition section B. Upon completion of the 60° rotation, further motion of shaft 74 into shutter guide pin 64 results in no rotational motion of shutter disk 70 but allows further movement of shutter cap 52 into shutter body 44 as the stud 76 moves through section C of camtrack 66. Thus, as shown in FIG. 6A, prior to such time as motion of shutter cap 52 occurs toward shutter body 44, optical contacts 36a and 36b are environmentally sealed because the apertures 58A and 58B in the shutter cap are not aligned with the apertures 72A and 72B in shutter disk 70. FIG. 6B shows that on completion of the translation of shutter cap 52 into shutter body 44, rotation of shutter disk 70 has occurred to align apertures 58A and 58B in shutter cap 52 with apertures 72A and 72B in shutter disk 70 thereby permitting access to female contacts 36a and 36b.

Figures 5, 5A:
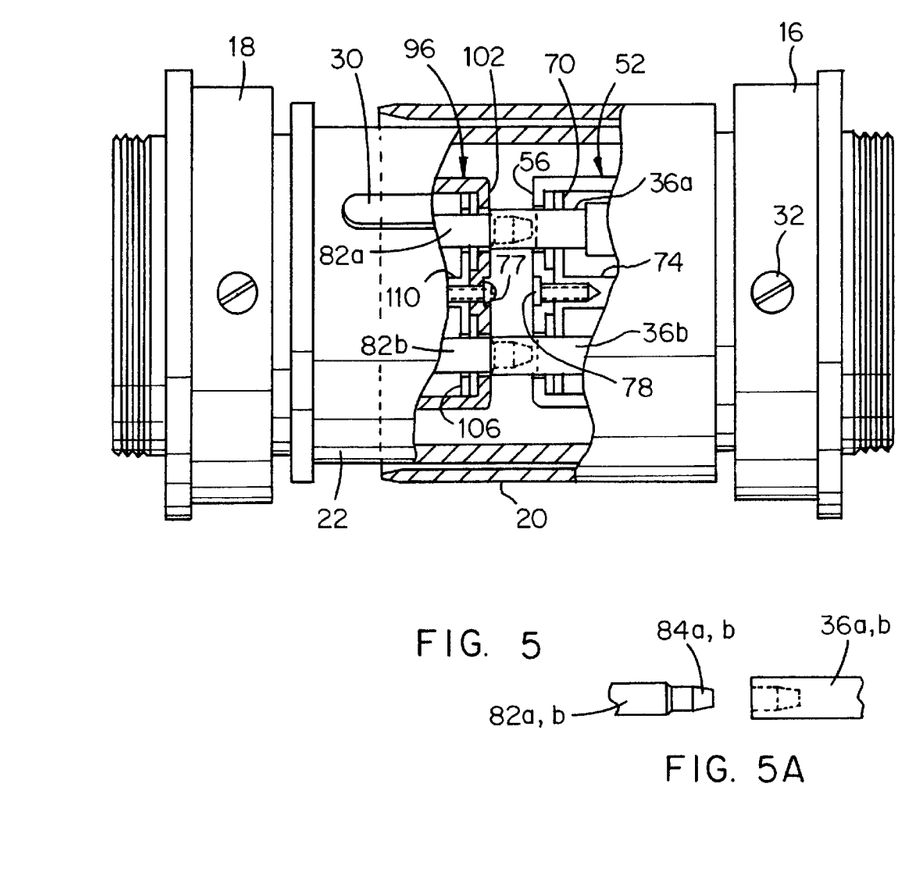
FIG. 5 is a side elevational view partially in cross-section showing the male and female portions of the connector prior to completion of mating of the male and female portions.
FIG. 5A is a side view of male and female optical contacts which may be used in the disclosed invention.

FIG. 5 illustrates that the cap portion 56 of shutter cap 52 includes a thrust pin 77 which is mounted along the axis A of female portion 12. A corresponding mating depression 78 to receive thrust pin 77 is contained on the central axis of the end cap of the shutter body of male portion 14.

The top surface of shutter 70 (that is, the surface away from the optical terminals) may have Teflon or low friction rubber pads 80 fastened thereto, for example by gluing, to facilitate rotation by reducing friction of the shutter 70 while rotating against the inner surface of the cap portion 56 of shutter body 52.

FIGS. 3A and 5A show the male optical contacts 82a and 82b which have tapered forward sections 84a and 84b respectively. The tapered sections contain optical windows or lenses (not shown) at their forward end and are connected to optical fibers 38 through means well known to those skilled in the art. The tapered ends 84a and 84b are received within the female optical contacts 36a, 36b respectively when the female and male portions of the fiber optic connector are mated. By providing optical contacts 36a and 36b with tapered interiors at their forward (male contact receiving) ends, slight misalignment between mating male and female optical contacts can be accommodated as the mating end of the female contacts and the tapered end of the male contacts "self-align" during the mating process. Optical contacts 82a and 82b are contained within apertures 86a and 86b which, in turn, are contained within insert 88 of the shutter mechanism 90. Since the construction and operation of the male portion 14 of the fiber optic connector 10 is nearly identical to the female portion 12, only a brief explanation will be given of the components comprising the male portion 14. Optical contacts 82a and 82b are retained within their respective apertures 86a and 86b by plugs 92. Coil springs 94 are contained within apertures 86a and 86b and force optical contact 82a and 82b away from plugs 92 when the female portion 12 and male portion 14 of the fiber optic connector are unmated. Shutter cap 96 is biased away from shutter body 98 by coil spring 100 when the female portion 12 and male portion 14 of the optical connector are unmated.

While the female optical contacts 36a and 36b are shown with recessed interiors, and the male optical contacts 82a and 82b are shown with tapered sections 84a and 84b respectively, it is also possible to eliminate the tapered interior portions from female contacts 36a and 36b and the tapered sections 84a and 84b from male contacts 82a and 82b, particularly by using expanded beam lenses which expand the optical beam transmitted through the fibers to compensate for slight misalignment of the male and female optical contacts. Additionally, it is possible to use male to male optical contacts, particularly where expanded beam lenses are used in the optical contacts contained on both the male and female portion of the fiber optic connector. Furthermore, the axis of expanded beam lenses will permit the optical contacts of the male and female portion to send and access signals even though an air gap exists between the mated optical contacts of the male and female portions. All of the foregoing combinations are considered to be within the spirit and scope of the invention.

Shutter cap 96 includes a fixed cap portion 102 which has apertures 104A and 104B contained therein. The apertures are aligned with the longitudinal axes of the optical contacts 82a and 82b. A shutter disk 106 having apertures 108A and 108B is rigidly fastened to a shaft 110. The shutter disc 106 includes a pair of Teflon or low friction rubber pads 107 fastened to the top side thereof to minimize friction between rotations of the shutter disc 106 and the underside of the cap 102. The shaft 110 is received within a shutter guide pin 112. Shutter guide pin 112 includes a camtrack 114. Movement of shaft 110 into shutter guide pin 112 causes rotation of shutter cap 106 as a guide pin on shaft 110 follows the camtrack contained on shutter guide pin 112. As can be seen from FIG. 4A, the configuration of camtrack 66 and the corresponding camtrack 114 in shutter guide pin 112 causes a 60° rotation of shutter disk 70 and a corresponding rotation of shutter disk 106 during mating of the female portion 12 and male portion 14 of the optical connector.

Referring now to FIG. 5, the end of shaft 74 distant from shutter guide 64 is retained in place against shutter cap 56 by means of a rivet 78 having a depression to receive thrust pin 77. Rivet 78 is loosely received in the end of shaft 74 to permit rotation of shutter 70. Thrust pin 77 fastens shaft 110 to cap portion 102 while permitting rotation of shutter disc 106. Thrust pin 77 also includes at its distant end a protruding portion which is received in a depression at the end of rivet 78 when the male and female portions of the optical connector are mated together as earlier described.

Mating of the respective female portion 12 and male portion 14 of the optical connector 10 will now be described, particularly with reference to FIGS. 4A, 4B and 5. As shown in FIG. 4A, prior to mating optical contacts 36a and 36b in female portion 12 and optical contacts 82a and 82b in male portion 14 are biased outwardly by coil springs 60 and 94 respectively. During the mating process, male body 22 enters female body 20 and, due to the springs 34 which resiliently restrain female portion 12 in flange 16 and male portion 14 in flange 18, slight axial misalignment between portions 12 and 14 may be accommodated to allow mating of portions 12 and 14. In particular, the tapered end 24 of female portion 12 and the tapered end 26 in the end of male portion 14 will facilitate alignment of shutter mechanism 42 and shutter mechanism 90 during mating of the respective male and female portions of the connector. Studs 28 engage alignment grooves 30 to guide male portion 14 into engagement with female portion 12. During the mating process, thrust pin 77 is engaged within mating depression 78 to further ensure alignment of shutter mechanisms 42 and 90.

As male portion 14 is moved toward female portion 12, shutter cap 52 of female portion 14 contacts shutter cap 96 of male portion 14. As shutter cap 52 and shutter cap 96 engage each other, the thrust pin portion of rivet 77 enters the depression in the end of rivet 78. Pressure applied to the male and female portions of the connector causes compression of spring 68 in the female portion and spring 100 in the male portion. Shutter cap 52 enters space 50 and similar motion occurs with respect to shutter cap 96 of the male portion. The motion of the shutter caps 52 and 96 cause rotation of shutters 70 and 106 respectively, as a result of the movement of shaft 74 into shutter guide pin 64 and the resultant rotation of shaft 74 caused by pin 76 following camtrack 66. A similar rotation occurs to shutter disk 106 due to the rotation of shaft 110 as it enters shutter guide pin 112. The rotation of shutter 70 causes apertures 58A and 58B to be opened due to the alignment of apertures 72A and 72B in shutter 70 with apertures 58A and 58B. Similarly, apertures 104A and 104B are opened because the apertures 108A and 108B in shutter disk 106 become aligned with apertures 104A and 104B. As shown in FIG. 5, continued motion of male portion 14 towards female portion 12 results in female contacts 36a and 36b becoming exposed through aligned apertures 58A, 72A and 58B, 72B respectively and male contacts 82a and 82b becoming exposed through aligned apertures 104A, 108A and 104B, 108B respectively. As a result of the motion of male portion 14 and female portion 12 toward each other, optical contact is made between female contacts 36a, 36b and male contacts 82a, 82b respectively to permit signals carried along optical fibers 38 to be transferred between adjacent cars through the mated optical contacts.

Springs 60 and 94 ensure that optical contacts 36a, 36b and 82a, 82b respectively remain in contact with each other to ensure optical signals transmitted between the contacts are not degraded as a resulted of an air gap occurring between contacts 36a and 82a, and 36b and 82b.

At such time as it is desired to disconnect the male and female portions of the optical connector 10, for example when a railway car is to be removed from a train, the male and female portions of the optical connector are moved away from each other. Springs 68 and 100 force the shutter caps 52 and 96 outwardly away from shutter bodies 44 and 98 respectively. The movement of the shutter caps causes the respective shaft 74 and 110 to move through shutter guides 64 and 112. The studs at the bottom of shafts 74 and 110 move through the respective camtracks in shutter guide pins 64 and 112 and, upon reaching the middle portion of the camtrack, each shutter 70 and 106 is caused to rotate. The rotation is timed by the length of cam section B to occur after shutter disks 70 and 106 have moved above the end of optical contacts 36a, 36b and 82a, 82b respectively. The completion of rotation of the shutter disks result in a change in the alignment of the respective apertures in shutter disc 70 and 106 respective to apertures contained in shutter caps 56 and 102 so that the optical contacts 36a, 36b and 82a, 82b are no longer exposed to the environment and are completely protected by shutter caps 52 and shutter disk 70 and shutter cap 96 and shutter disk 106.

It will be readily seen by one of ordinary skill in the art that the present invention fulfills all of the objects set forth above. After reading of the foregoing specification, one of ordinary skill will be able to effect various changes, substitutions of equivalents and various other aspects of the invention as broadly disclosed herein. For example, a fewer or greater number of optical contacts can be accommodated in each connector half, and electrical contacts can supplement or be substituted for the optical contacts. Furthermore, while the optical contacts have been shown with springs for biasing the male and female optical contacts, it is possible to carry out the teachings of the invention without using any spring biasing on either the male and/or female contacts, or by using spring biasing for either the male or female contacts without biasing the other set of contacts. Furthermore, while the male and female portions of the connector have been described as having spring mounts between the male and female portions and their respective mounting flanges to facilitate connection of the male and female portions in spite of slight axial misalignment between the male and female portions, it is also possible to rigidly mount the male and female portions of the connector to their respective flanges. It is therefore intended that the protection granted hereon be limited only by the definition contained in the appended claims and equivalents hereof.

What is claimed is:

1. A connector for connecting male and female fiber optic contacts, said male and female fiber optic contacts each carrying optical signals, said connector being comprised of a male portion and a female portion, said male portion having one or more fiber optic male optical contacts and said female portion having one or more female optical contacts for interconnection when said male and female portions of said connector are connected together, said male portion of said connector and said female portion of said connector each containing a shutter cap for protecting said female contacts and said male contacts when the female portion of said connector is disconnected from said male portion of said connector, said shutter caps moving from a first position to a second position to expose said male contacts and said female contacts when said male portion of said connector is engaged with said female portion of said connector and said shutter caps returning to said first position when the male portion of said connector is removed from engagement with the female portion of said connector, said shutter caps protecting said male contacts and said female contacts when the male portion of said connector is disengaged from the female portion of said connector.

2. The connector of claim 1 wherein said shutter caps translate axially along the axes of said male and female portions of said connector when the male portion of said connector is engaging the female portion of said connector.

3. The connector of claim 1 wherein said shutter caps each include a shutter, said shutters being rotatable around the longitudinal axes of said male and female portions to shield said male and female contacts from environmental contamination when said shutters are in a first position and to permit said male and female contacts to be connected to each other when said shutters are in a second position.

4. The connector of claim 3 wherein one or more of said fiber optic male contacts are each biased against their corresponding female optical contacts when said male portion of said connector is connected to said female portion of said connector.

5. The connector of claim 4 wherein said male optical contacts and said female optical contacts are each biased by a spring against its mating optical contact when said male portion of said connector is engaged with said female portion of said connector.

6. The fiber optic connector of claim 1 wherein each of said male optical contacts is engaged against its corresponding female optical contact when the male portion of said connector is engaged with the female portion of said connector.

7. The connector of claim 2 wherein the shutter cap of the male portion of said connector includes a protruding stud on its surface which is axially aligned with the longitudinal axis of the male portion of said connector and the shutter cap on the female portion of said connector includes a depression located on the surface of the shutter cap along the longitudinal axis of the female portion of said connector, whereby the stud of the male portion of said connector engages the depression in the female portion of said connector when said male portion of said connector is engaged against the female portion of said connector.

* * * * *